(12) United States Patent
Matsubara

(10) Patent No.: US 8,148,652 B2
(45) Date of Patent: Apr. 3, 2012

(54) POSITION DETECTING DEVICE AND POSITION DETECTING METHOD

(75) Inventor: Masaki Matsubara, Meguro-ku (JP)

(73) Assignee: Wacom Co., Ltd., Saitama (JP)

( * ) Notice: Subject to any disclaimer, the term of this patent is extended or adjusted under 35 U.S.C. 154(b) by 585 days.

(21) Appl. No.: 12/362,438

(22) Filed: Jan. 29, 2009

(65) Prior Publication Data
US 2010/0033437 A1  Feb. 11, 2010

(30) Foreign Application Priority Data

Feb. 13, 2008  (JP) .................................. 2008-031857

(51) Int. Cl.
*G06F 3/044*  (2006.01)
(52) U.S. Cl. ............... 178/18.06; 178/18.01; 178/18.03; 345/173; 345/174
(58) Field of Classification Search .................... 345/173
See application file for complete search history.

(56) References Cited

U.S. PATENT DOCUMENTS

| 4,054,746 | A | * | 10/1977 | Kamm ........................ 178/18.03 |
| 4,080,515 | A | * | 3/1978 | Anderson .................... 178/18.07 |
| 4,240,065 | A | * | 12/1980 | Howbrook ..................... 382/315 |
| 4,243,843 | A | * | 1/1981 | Rocheleau ................. 178/19.03 |
| 4,568,799 | A | * | 2/1986 | Kobayashi et al. ........ 178/18.07 |
| 4,672,447 | A | * | 6/1987 | Moring et al. ................ 348/537 |
| 4,704,501 | A | * | 11/1987 | Taguchi et al. ............... 345/173 |
| 4,728,944 | A | * | 3/1988 | Tamaru et al. ................ 345/174 |
| 4,786,765 | A | * | 11/1988 | Yamanami et al. ......... 178/19.06 |
| 5,045,645 | A | * | 9/1991 | Hoendervoogt et al. .. 178/19.07 |
| 5,136,125 | A | * | 8/1992 | Russell ....................... 178/18.07 |
| RE34,187 | E | * | 3/1993 | Yamanami et al. ......... 178/18.07 |
| 5,428,192 | A | * | 6/1995 | Chen et al. .................. 178/20.03 |
| 5,619,431 | A | * | 4/1997 | Oda .............................. 702/150 |
| 5,661,269 | A | * | 8/1997 | Fukuzaki et al. .......... 178/19.06 |
| 5,679,930 | A | * | 10/1997 | Katsurahira ............... 178/19.06 |

(Continued)

FOREIGN PATENT DOCUMENTS
JP  10-20992 A  1/1998

OTHER PUBLICATIONS

Extended European Search Report, for corresponding European Application No. 09001909.2, dated Dec. 6, 2011, 3 pages.

*Primary Examiner* — Richard Hjerpe
*Assistant Examiner* — Dorothy Harris
(74) *Attorney, Agent, or Firm* — Seed IP Law Group PLLC

(57) ABSTRACT

A position detecting device includes: X-axis electrodes and Y-axis electrodes; a driving section for supplying an AC signal to the X-axis electrodes; a synchronous clock generating section for generating synchronous clock signals at the timing when the AC signal passes through zero-cross points; a first switch for selectively supplying the AC signal outputted from the driving section to one of the X-axis electrodes at the timing of the synchronous clock signal; a second switch for selecting one of the Y-axis electrodes at the timing of the synchronous clock signal; a synchronous detector for synchronous-detecting a signal outputted by the Y-axis electrodes through the second switch; and a position calculating section for calculating a position indicated by an indicator based on the signal outputted from the synchronous detector, wherein the position corresponds to one or more intersections of the X-axis electrodes and Y-axis electrodes.

10 Claims, 9 Drawing Sheets

U.S. PATENT DOCUMENTS

| | | | |
|---|---|---|---|
| 5,714,720 A * | 2/1998 | Landmeier | 178/19.03 |
| 5,792,997 A * | 8/1998 | Fukuzaki | 178/18.07 |
| 5,898,136 A * | 4/1999 | Katsurahira | 178/18.01 |
| 6,005,555 A * | 12/1999 | Katsurahira et al. | 345/174 |
| 6,810,351 B2 * | 10/2004 | Katsurahira | 702/150 |
| 6,912,444 B2 * | 6/2005 | Pohl et al. | 700/174 |
| 7,005,843 B2 * | 2/2006 | Matsubara | 324/76.67 |
| 7,474,300 B2 * | 1/2009 | Katsurahira et al. | 345/179 |
| 7,868,873 B2 * | 1/2011 | Palay et al. | 345/173 |
| 2006/0232567 A1 | 10/2006 | Westerman et al. | |
| 2007/0074913 A1 | 4/2007 | Geaghan et al. | |
| 2007/0146351 A1 * | 6/2007 | Katsurahira et al. | 345/179 |

* cited by examiner

POSITION DETECTING DEVICE AND POSITION DETECTING METHOD

CROSS REFERENCES TO RELATED APPLICATIONS

The present application claims priority under 35 U.S.C. §119 to Japanese Patent Application No. JP 2008-031857 filed in the Japanese Patent Office on Feb. 13, 2008, the entire contents of which are incorporated herein by reference.

BACKGROUND OF THE INVENTION

1. Field of the Invention

The present invention relates to improving scanning speed of, for example, an electrostatic capacity type position detecting device.

2. Description of the Related Art:

There are various kinds of input devices for providing position information to a computer. One such device is a touch panel capable of detecting a position on a flat detection surface where a finger or a dedicated stylus pen touches. The touch panel will output an instruction corresponding to the detected position to the computer as input information. The touch panel is widely used in PDAs (Personal Digital Assistants), ATMs (Automated Teller Machines), railway ticket-vending machines, and the like.

Touch panels can use various kinds of positional information detection technologies. For example, there is a resistance film type position detecting device that detects a position based on pressure change, an electrostatic capacity type position detecting device that detects a position based on capacitance change, and the like.

An electrostatic capacity type position detecting device will be described below. FIG. 8 is a block diagram showing an electrostatic capacity type position detecting device 801 according to the related art.

As seen in FIG. 8, the position detecting device 801 includes a driving section 802, an X-axis electrode side change-over switch 103, a Y-axis electrode side change-over switch 105, matrix electrodes 104, a receiving section 803, a position calculating section 124, and a synchronous clock generating section 807.

The driving section 802 generates an AC voltage having a frequency of 200 kHz, which is the frequency most easily absorbed by the human body. The AC voltage generated by the driving section 802 is selectively applied through the X-axis electrode side change-over switch 103 to a plurality of electrodes arranged in an X-axis direction of the matrix electrodes 104.

The matrix electrodes 104 are a sensor arranged on a flat detection surface (not shown), and are adapted to detect a position of a pointing device (not shown), such as a finger, a dedicated stylus pen, or the like. The matrix electrodes 104 are formed with a plurality of elongated conductive electrodes arranged longitudinally and latitudinally, and each intersection of the electrodes effectively forms a small-capacity capacitor. The AC voltage having a frequency of 200 kHz is applied to the small-capacity capacitors.

The Y-axis electrode side change-over switch 105 is a switch for selecting one electrode from a plurality of electrodes arranged in a Y-axis direction of the matrix electrodes 104.

The receiving section 803 is a device for converting a slight signal change, which is caused when a finger of a human body or the like approaches the matrix electrodes 104, into digital data. The receiving section 803 amplifies the signal obtained from the electrode selected by the Y-axis electrode side change-over switch 105 and performs predetermined signal processing.

The position calculating section 124, which includes a microcomputer, determines whether there is a finger on the matrix electrodes 104. The position calculating section 124 further calculates position information of the finger based on address information obtained from the synchronous clock generating section 807 and data corresponding to the slight signal change obtained from the receiving section 803.

In the following description of the matrix electrodes 104, the electrode group formed by the plurality of electrodes connected to the X-axis electrode side change-over switch 103 is referred to as X-axis electrodes 104a, and the electrode group formed by the plurality of electrodes connected to the Y-axis electrode side change-over switch 105 is referred to as Y-axis electrodes 104b.

Next, the internal structure of the driving section 802 will be described below.

The driving section 802 includes a clock generator 109, a readout section 804, a sine wave ROM 107, a D/A converter 110, a LPF 111, and a driver 112.

The clock generator 109 is an oscillator for generating a clock that is supplied to the readout section 804. The sine wave ROM 107 has 8 bits×256 samples of pseudo sine wave data stored therein. Based on the clock supplied by the clock generator 109, the readout section 804 designates an address of the sine wave ROM 107 and reads out the data.

The data read out from the sine wave ROM 107, by the readout section 804, is D/A converted by the D/A converter 110 and smoothed by the LPF 111 so as to be converted into an analog sine wave signal. Thereafter, the voltage of the analog sine wave signal is amplified by the driver 112 and applied to the X-axis electrodes 104a as an AC voltage.

Next, the internal structure of the receiving section 803 will be described below.

The receiving section 803 includes a current-voltage converter 113, a synchronous detector 114, an A/D converter 116, a preamplifier 117, and an integrator 805.

The current-voltage converter 113, which is an inverting amplifier of an operational amplifier, is connected to the Y-axis electrode side change-over switch 105. The current-voltage converter 113 is needed because the current flowing through each of the small-capacity capacitors formed at the intersections of the X-axis electrodes 104a and Y-axis electrodes 104b is extremely small and therefore needs to be amplified and converted into a voltage.

The signal outputted from the current-voltage converter 113 is further amplified by the preamplifier 117, which is an inverting amplifier of an operational amplifier, and inputted to the synchronous detector 114.

The synchronous detector 114 is configured with an inverting amplifier 118 and a change-over switch 119. A rectangular cosine wave outputted from the readout section 804 of the driving section 802 is inputted to the change-over switch 119, and controls the change-over switch 119.

When the AC voltage is applied to the small-capacity capacitors, the phase of the current flowing through the capacitors is advanced by 90 degrees compared with the phase of the AC voltage applied to the capacitors. Thus, in order to synchronously detect the current flowing through the capacitors and into the synchronous detector 114 via the Y-axis electrode side change-over switch 105, the AC voltage inputted from the X-axis electrode side change-over switch 103 to the matrix electrodes 104 has to be shifted by 90 degrees. For this purpose, the rectangular cosine wave outputted from the readout section 804 of the driving section 802 is shifted by 90 degrees with respect to the signal having a frequency of 200 kHz outputted from the driving section 802.

The synchronous detector 114 performs a function identical to well-known diode detection of a weak signal. The signal outputted from the synchronous detector 114 is inputted to the integrator 805 configured with a resistor R120, a capacitor C122, and an operational amplifier 121. The signal outputted from the integrator 805 is inputted to the A/D converter 116. The A/D converter 116 converts the inputted analog voltage to an outputted digital value.

The position calculating section 124 serves a function of a microcomputer. Based on the data obtained from the A/D converter 116, the position calculating section 124 calculates the value of the current flowing through each of the small-capacity capacitors formed at the electrode intersections of the matrix electrodes 104. Based on the calculated value of the current, the position of the finger is detected and the result is outputted as position data.

With the position detecting device 801 according to the related art, by controlling the X-axis electrode side change-over switch 103 and the Y-axis electrode side change-over switch 105 to changeover the electrodes of the X-axis electrodes 104a and Y-axis electrodes 104b, to which the AC voltage is to be applied, a finger can be detected at each of the intersections of the matrix electrodes 104.

Diagrams (a), (b), (c), (d),(e), and (f) of FIG. 9 show waveform diagrams indicating change of signals generated by the related art position detecting device 801 and timing charts indicating operation timing of predetermined circuit portions.

Diagram (a) of FIG. 9 is a waveform diagram of the voltage of a sine wave having a frequency of 200 kHz generated by the driving section 802. The waveform of the voltage of the sine wave is detected at point P821 shown in FIG. 8.

Diagram (b) of FIG. 9 is a waveform diagram of the current generated at each of the intersections of the matrix electrodes 104. The waveform of the current is detected at point P822 shown in FIG. 8.

Note that when the AC voltage is applied to the small-capacity capacitors the phase of the waveform of diagram (b) is advanced by 90 degrees compared with the phase of the waveform of diagram (a) in FIG. 9. This is because the phase of the current flowing through the capacitors is advanced by 90 degrees compared with the phase of the AC voltage applied to the capacitors.

Diagram (c) of FIG. 9 is a waveform diagram of a signal obtained after performing a synchronous detection on the signal shown in diagram (b) of FIG. 9. The waveform shown in diagram (c) of FIG. 9 is detected at point P823 shown in FIG. 8. As shown in diagram (c) of FIG. 9, by performing the synchronous detection, the AC signal is converted into a DC pulsating current.

Diagram (d) of FIG. 9 is a waveform diagram of a signal obtained by integrating the signal of diagram (c) of FIG. 9 from time t20 to time t21 with the integrator 805. The waveform shown in diagram (d) of FIG. 9 is detected at point P824 shown in FIG. 8.

Diagram (e) of FIG. 9 shows operation timing of the A/D converter 116. The A/D converter 116 converts the analog voltage of the integrator 805, from time t21 to time t22, to a digital value.

Diagram (f) of FIG. 9 shows operation timing of a discharge switch 806. The discharge switch 806 is controlled so as to close between time t22 and time t23. By controlling the discharge switch 806 to close, the capacitor C122 is discharged, and the output voltage of the integrator 805 returns to zero.

Some of the prior art can be found in Japanese Unexamined Patent Application Publication No. 10-020992.

SUMMARY OF THE INVENTION

In the aforesaid electrostatic capacity type position detecting device 801, the integration processing and the A/D conversion processing are performed on each of the intersections of the X-axis electrodes 104a and Y-axis electrodes 104b. The time necessary for performing the integration processing and A/D conversion processing for each intersection is 30 μsec.

In the case where the integration processing and the A/D conversion processing are performed for each intersection on position detecting devices that are relatively small in size, no serious problem will occur. On position detecting devices that are relatively larger in size, problems will arise with the integration processing and the A/D conversion processing for each intersection.

In order to make a large position detecting device 801, the flat detection surface can be made large by increasing the number of electrodes of the X-axis electrodes 104a and Y-axis electrodes 104b of the matrix electrodes 104. However, if the number of the electrodes of the X-axis electrodes 104a and Y-axis electrodes 104b increases, the number of the intersections will increase too. The larger the number of intersections, the longer the time necessary for scanning the flat detection surface.

Generally, the preferred resolution of a pointing device of a position detecting device, such as a mouse or the like, is about 10 msec. Thus, under the constraint that processing for each of the intersections of the position detecting device is 30 μsec, the number of the intersections that can be formed in the flat detection surface is about 333.

Various embodiments of the present invention are directed to providing an electrostatic capacity type position detecting device having a large-sized flat position detection surface. The target number of intersections in the flat position detection surface of the position detecting device is 15,000. Accordingly, desired resolution can not be achieved if a position detecting device is made using the technologies disclosed in the related art.

If the position detecting device is an electromagnetic induction type position detecting device, position detection speed can be increased by increasing the frequency of the AC voltage applied to the flat position detection surface. However, if the position detecting device is an electrostatic capacity type position detecting device, the frequency of the applied AC voltage cannot be increased since there is an inherent constraint that the frequency most easily absorbed by the human body (for example, a frequency of 200 kHz) has to be used.

Another manner of position detection includes dividing the intersections into a plurality of intersection groups, and providing a plurality of position detecting circuits to the respective intersection groups. However, if a plurality of position detecting circuits are provided, not only will the device become large and expensive, but the device will also be more difficult to design.

In view of the aforesaid problems, it is an object of the present invention to provide a position detecting device and a position detecting method capable of performing high speed scanning with a relatively simple circuit configuration.

A position detecting device according to an embodiment of the present invention includes: X-axis electrodes formed by a plurality of conductors that are arranged substantially parallel to each other; Y-axis electrodes formed by a plurality of conductors that are arranged substantially parallel to each other and that extend perpendicularly to the X-axis electrodes; a driving section for supplying an AC signal to the X-axis electrodes; a synchronous clock generating section for generating a synchronous clock at the timing when the AC signal passes through zero-cross points; a first change-over switch for selectively supplying the AC signal outputted from the driving section to a predetermined electrode among the X-axis electrodes in response to the input of the synchronous clock; a second change-over switch for selecting a predetermined electrode among the Y-axis electrodes in response to the synchronous clock; a synchronous detector for synchronous-detecting a signal outputted by the Y-axis electrode through the second change-over switch based on the synchronous clock, and outputting a resulting signal; and a position calculating section for calculating a position indicated by an indicator based on the signal outputted from the synchronous detector, wherein the position corresponds to an intersection of the X-axis electrode and Y-axis electrode.

It is preferred that the aforesaid position detecting device further includes a filtering section for filtering out (or removing) a predetermined frequency component from the signal outputted from the synchronous detector, and outputting the filtered signal (without the predetermined frequency component).

It is further preferred that in the aforesaid position detecting device, the AC signal supplied by the driving section is a rectangular wave.

A position detecting method according to another aspect of the present invention is a method for calculating a position indicated by an indicator. The position corresponds to one of intersections of X-axis electrodes formed by a plurality of conductors that are arranged substantially parallel to each other, and Y-axis electrodes formed by a plurality of conductors that are arranged substantially parallel to each other and that extend perpendicularly to the X-axis electrodes. The method includes: generating a synchronous clock at the timing when an AC signal supplied to the X-axis electrodes passes through zero-cross points; selectively supplying the AC signal to the X-axis electrodes in response to the synchronous clock; selecting one of the Y-axis electrodes in response to the synchronous clock for synchronously-detecting a signal outputted by the selected one of the Y-axis electrodes based on the synchronous clock; and calculating the position indicated by the indicator based on a signal obtained from the synchronous-detecting.

According to various embodiments of the present invention, it is possible to provide an electrostatic capacity type position detecting device and a position detecting method capable of performing high speed scanning with a relatively simple circuit configuration.

DETAILED DESCRIPTION OF THE PREFERRED EMBODIMENT(S)

Figure 1:
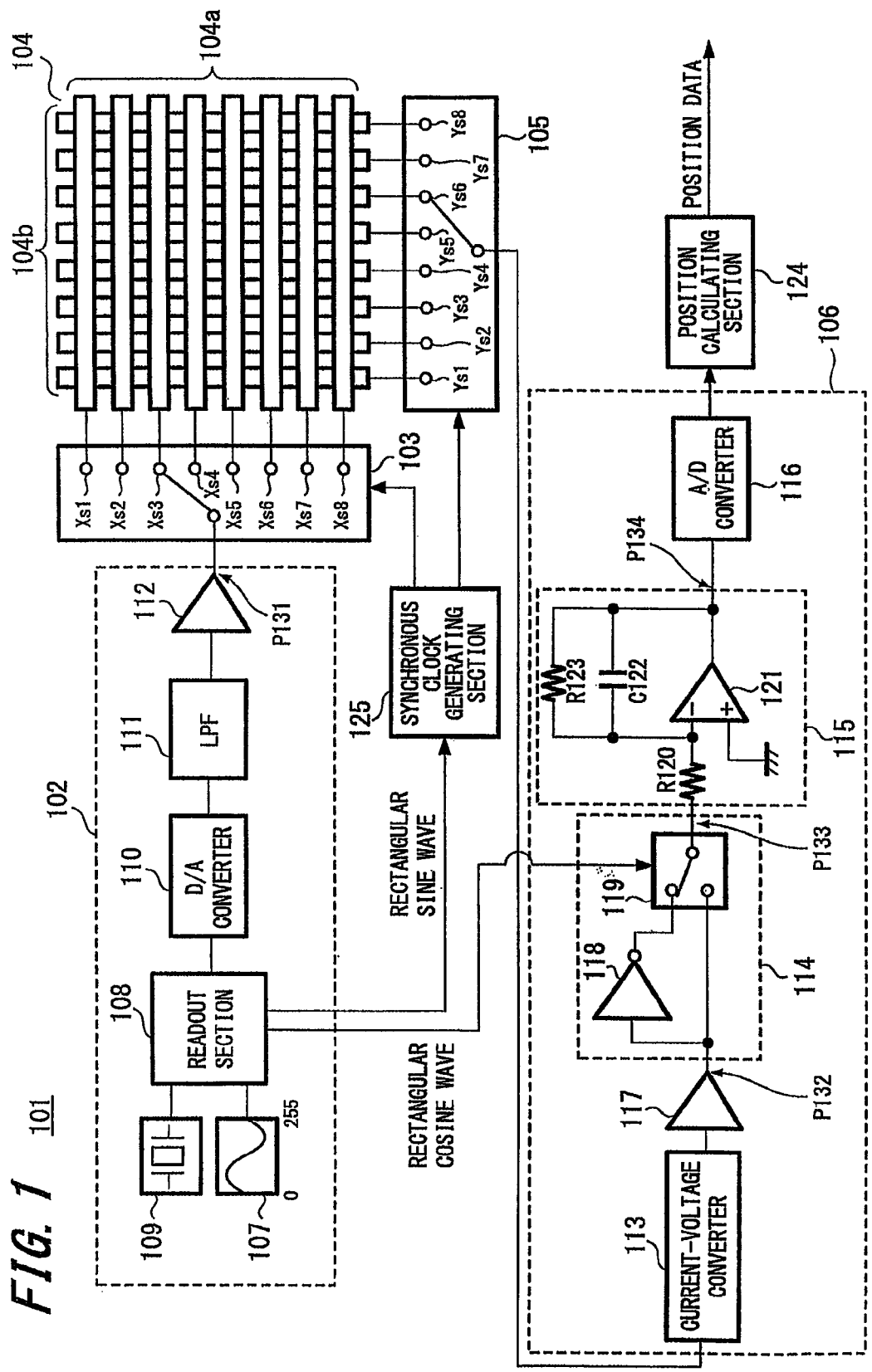
FIG. 1 is a block diagram showing a configuration of a position detecting device according to an embodiment of the present invention.

An embodiment of the present invention will be described below with reference to FIGS. 1 to 7.

A configuration of a position detecting device 101 according to the embodiment will be described with reference to FIG. 1. The position detecting device 101 includes a driving section 102, an X-axis electrode side change-over switch 103, matrix electrodes 104, a Y-axis electrode side change-over switch 105, a receiving section 106, and a position calculating section 124.

The driving section 102 generates an AC (Alternating Current) signal, including a signal with waveform (e.g., sine waveform) or a signal with pulse waveform, each having a frequency of 200 kHz, which is the frequency most easily absorbed by a human body. The AC voltage generated by the driving section 102 is applied to the matrix electrodes 104.

The matrix electrodes 104 are formed by a plurality of elongated conductive electrodes arranged longitudinally and latitudinally. Specifically, the matrix electrodes 104 are configured by X-axis electrodes 104a formed by a plurality of electrodes arranged in parallel and Y-axis electrodes 104b formed by a plurality of electrodes arranged in parallel. The X-axis electrodes 104a and the Y-axis electrodes 104b are perpendicular to each other. A thin dielectric (which is to be described later) is interposed between the X-axis electrodes 104a and the Y-axis electrodes 104b.

Due to such a configuration, a small-capacity capacitor is formed at each of the intersections (referred to as "electrode intersections" hereinafter) between the X-axis electrodes 104a and the Y-axis electrodes 104b. Thus, when the AC voltage is applied to an electrode selected from the X-axis electrodes 104a and an electrode selected from the Y-axis electrodes 104b, a current will flow through the small-capacity capacitor formed at the electrode intersection of the selected X-axis electrode and the selected Y-axis electrode.

Further, the surface of the X-axis electrodes 104a is covered with a thin insulating layer (not shown), so that the human body, or the like, does not directly contact the X-axis electrodes 104a. When a finger, for example, approaches the electrodes of the X-axis electrodes 104a and Y-axis electrodes 104b, the capacitance of the small-capacity capacitor (formed at each electrode intersection) will slightly decrease due to the electric force field lines generated by the electrodes being drawn toward the finger. This change in capacitance strongly depends on the frequency of the AC voltage applied to the small-capacity capacitor. For this reason, the frequency of the AC voltage supplied to X-axis electrodes 104a is set to 200 kHz in the present embodiment.

The receiving section 106 detects a slight change of the current, when the AC voltage generated by the driving section 102 is applied to the matrix electrodes 104. When a finger, for example, approaches the electrode intersections of the matrix electrodes 104, to which the AC voltage is applied, electric force field lines near the electrode intersections will be drawn toward the finger side. The capacitance of the small-capacity capacitors formed at the electrode intersections near the finger will slightly decrease compared with the capacitance of the small-capacity capacitors formed at the other electrode intersections. In other words, the current flowing through these small-capacity capacitors will slightly decrease. The receiving section 106 detects the slight change of the current.

Next, the internal structure of the driving section 102 will be described. The driving section 102 includes a clock generator 109, a sine wave ROM 107, a readout section 108, a D/A converter 110, a LPF 111, and a driver 112. The clock generator 109 is an oscillator for generating a clock, which is supplied to the readout section 108.

The sine wave ROM 107 has 8 bits×256 samples of pseudo sine wave data stored therein. Based on the clock supplied by the clock generator 109, the readout section 108 designates an address of the sine wave ROM 107 and reads out the data.

The data read out from the sine wave ROM 107 by the readout section 108 is D/A converted by the D/A converter 110 and smoothed by the LPF 110 so as to be converted into an analog sine wave signal. Thereafter, the voltage of the analog sine wave signal is amplified by the driver 112 to become an AC voltage having a frequency of 200 kHz. The AC voltage is applied to one of the electrodes of the X-axis electrodes 104a through the X-axis electrode side change-over switch 103 (which is to be described later).

The readout section 108 generates a rectangular sine wave and supplies the generated rectangular sine wave to a synchronous clock generating section 125. The rectangular sine wave has the same phase as the AC voltage and has a period equal to an integral multiple of the period of the AC voltage. Further, the readout section 108 generates a rectangular cosine wave and supplies the generated rectangular cosine wave to a change-over switch 119 of a synchronous detector 114, the rectangular cosine wave having the same frequency as the AC voltage. The rectangular sine wave and the rectangular cosine wave outputted by the readout section 108 are perpendicular to each other.

Next, the X-axis electrode side change-over switch 103 and the Y-axis electrode side change-over switch 105 will be described. The X-axis electrode side change-over switch 103 is a switch for selecting at least one electrode from the X-axis electrodes 104a. The X-axis electrode side change-over switch 103 is arranged between the driving section 102 and the matrix electrodes 104.

The Y-axis electrode side change-over switch 105 is a switch for selecting at least one electrode from the Y-axis electrodes 104b. The Y-axis electrode side change-over switch 105 is arranged between the matrix electrodes 104 and the receiving section 106. The timing of the change-over operation of the change-over switches 103 and 105 is controlled by the synchronous clock generating section 125, which is to be described later.

Next, the internal structure of the receiving section 106 will be described. The receiving section 106 includes a current-voltage converter 113, a preamplifier 117, the synchronous detector 114, a LPF (low-pass filter) 115, an A/D converter 116, and the like.

The current-voltage converter 113, which is an inverting amplifier of an operational amplifier, is connected to the Y-axis electrode side change-over switch 105. The current-voltage converter 113 is needed because the current flowing through the small-capacity capacitor formed at each of the electrode intersections of the X-axis electrodes 104a and the Y-axis electrodes 104b is extremely small and therefore needs to be amplified and converted into a voltage. The signal outputted from the current-voltage converter 113 is further amplified by the preamplifier 117 and inputted into the synchronous detector 114.

The synchronous detector 114 is configured with an inverting amplifier 118 and the change-over switch 119, and performs a function identical to well-known diode detection of a weak signal. The change-over switch 119 has three terminals thereof respectively connected to the inverting amplifier 118, the preamplifier 117, and the LPF 115. A rectangular cosine wave outputted from the readout section 108 of the driving section 102 is inputted to the change-over switch 119 to control the change-over switch 119.

When the rectangular cosine wave inputted to the change-over switch 119 is positive, the change-over switch 119 will connect directly to the preamplifier 117 to select the outputted signal. When the rectangular cosine wave inputted to the change-over switch 119 is negative, the change-over switch 119 will connect directly to the inverting amplifier 118 to select the outputted signal.

The rectangular cosine wave inputted to the change-over switch 119 is a rectangular wave having a phase that is different by 90 degrees from that of the AC voltage of 200 kHz outputted by the driving section 102 (i.e., the rectangular cosine wave and the AC voltage of 200 kHz are perpendicular to each other).

When the AC voltage is applied to the small-capacity capacitors, the phase of the current flowing through the small-capacity capacitors is advanced by 90 degrees compared with the phase of the AC voltage applied to the small-capacity capacitors. Thus, when synchronously detecting the current flowing through the small-capacity capacitors, the change-over operation of the change-over switch 119 needs to be performed at such timing that the phase of the current flowing through the small-capacity capacitors and into the synchronous detector 114 will be shifted by 90 degrees with respect to the AC voltage applied to the matrix electrodes 104.

The signal outputted from the synchronous detector 114 is inputted to the LPF 115, which is configured with a resistor R120, a resistor R123, an operational amplifier 121, and a capacitor C122. The cut-off frequency of the LPF 115 is set to 50 kHz so that the frequency components of 50 kHz or higher of the inputted signal are removed (filtered out) from the output.

The signal outputted from the LPF 115 is converted into digital data by the A/D converter 116, and the digital data is inputted to the position calculating section 124 to be subjected to predetermined arithmetic processing.

The position calculating section 124 serves a function of a microcomputer. Based on the data obtained from the A/D converter 116, the position calculating section 124 calculates the value of the current flowing through the small-capacity capacitor formed at each of the electrode intersections of the matrix electrodes 104. Based on the calculated value of the current, the position calculating section 124 detects the position where the finger contacts the matrix electrodes 104 and outputs the result as position data.

The synchronous clock generating section 125 also serves a function of a microcomputer. The synchronous clock generating section 125 controls the change-over operation of the X-axis electrode side change-over switch 103 and Y-axis electrode side change-over switch 105 at the rise and fall edges of the rectangular sine wave outputted from the readout section 108. As described above, the rectangular sine wave has a period equal to an integral multiple of the period of the AC voltage applied to the matrix electrodes 104. In other words, the synchronous clock generating section 125 controls the change-over operation of the X-axis electrode side change-over switch 103 and the Y-axis electrode side change-over switch 105 in a predetermined order at the timing when the AC voltage passes through the zero-cross points. The reason why the change-over operation of the X-axis electrode side change-over switch 103 and Y-axis electrode side change-over switch 105 should be performed at the zero-cross timing will be described later.

Figure 2:
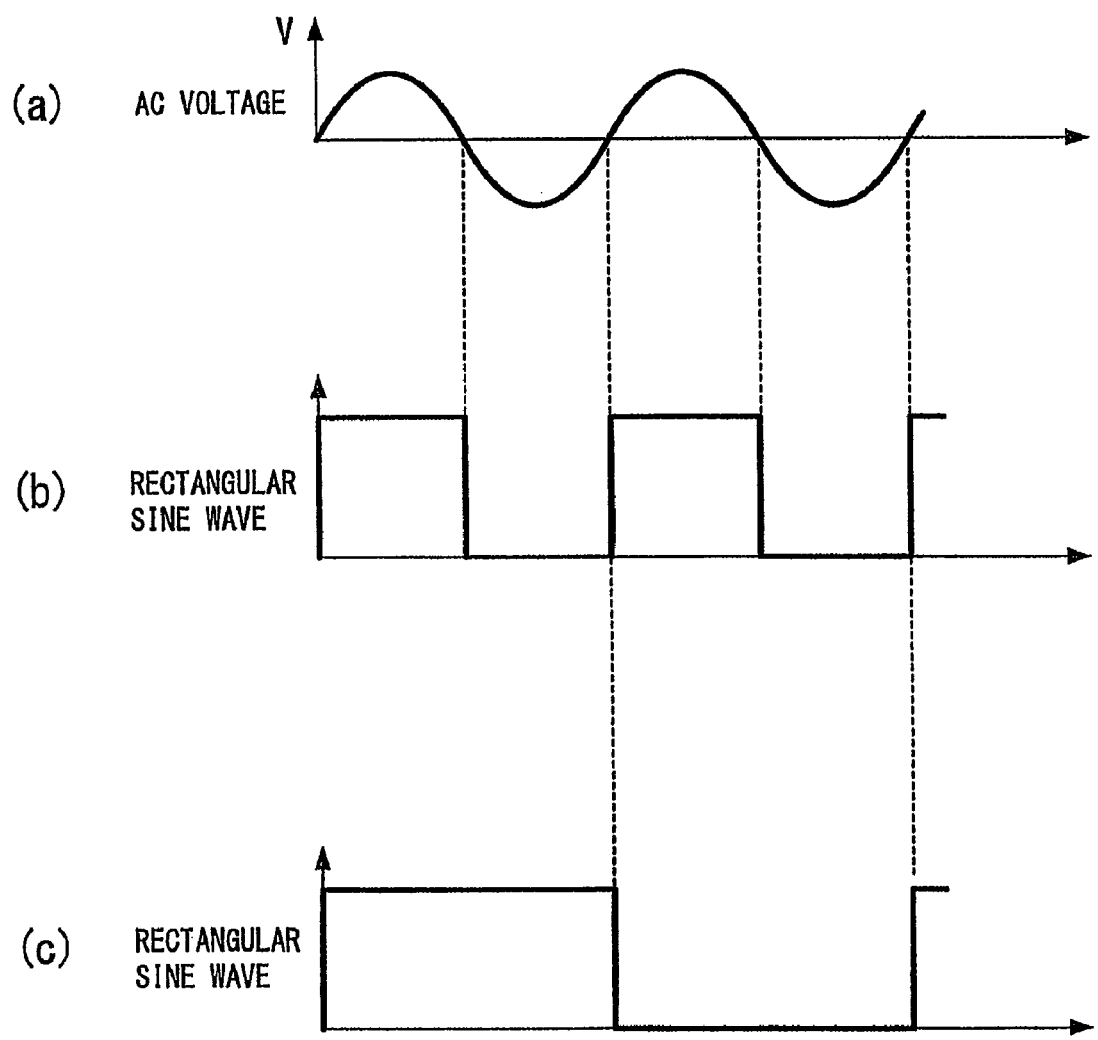
FIG. 2 shows a relationship between an AC voltage applied to matrix electrodes and a rectangular sine wave for controlling a change-over switch according to the previous embodiment.

Next, the relationship between the AC voltage generated by the driving section 102 and the rectangular sine wave generated by the readout section 108 will be described with reference to FIG. 2. Diagram (a) of FIG. 2 shows a waveform of the AC voltage generated by the driving section 102; diagram (b) of FIG. 2 shows a waveform of a rectangular sine wave having the same phase and the same period as the AC voltage shown in diagram (a) of FIG. 2; and diagram (c) of FIG. 2 shows a waveform of a rectangular sine wave having the same phase as the AC voltage shown in diagram (a) and a period equal to a double period of the AC voltage. The rectangular sine wave shown in diagram (b) of FIG. 2 is an example of the rectangular sine wave generated by the readout section 108, and the rectangular sine wave shown in diagram (c) of FIG. 2 is another example of the rectangular sine wave generated by the readout section 108.

As described above, since the rectangular sine wave of diagram (b) and the AC voltage are generated at the same phase, the rise and fall edges of the rectangular sine wave always coincide with the timing at which the AC voltage passes through the zero-cross points. Further, since the rectangular sine wave of diagram (c) having a period equal to double the period of the AC voltage is also generated at the same phase as the AC voltage, the rise and fall edges of the rectangular sine wave occur once every period of the AC voltage and coincide with the timing at which the AC voltage passes through the zero-cross points.

Figure 3:
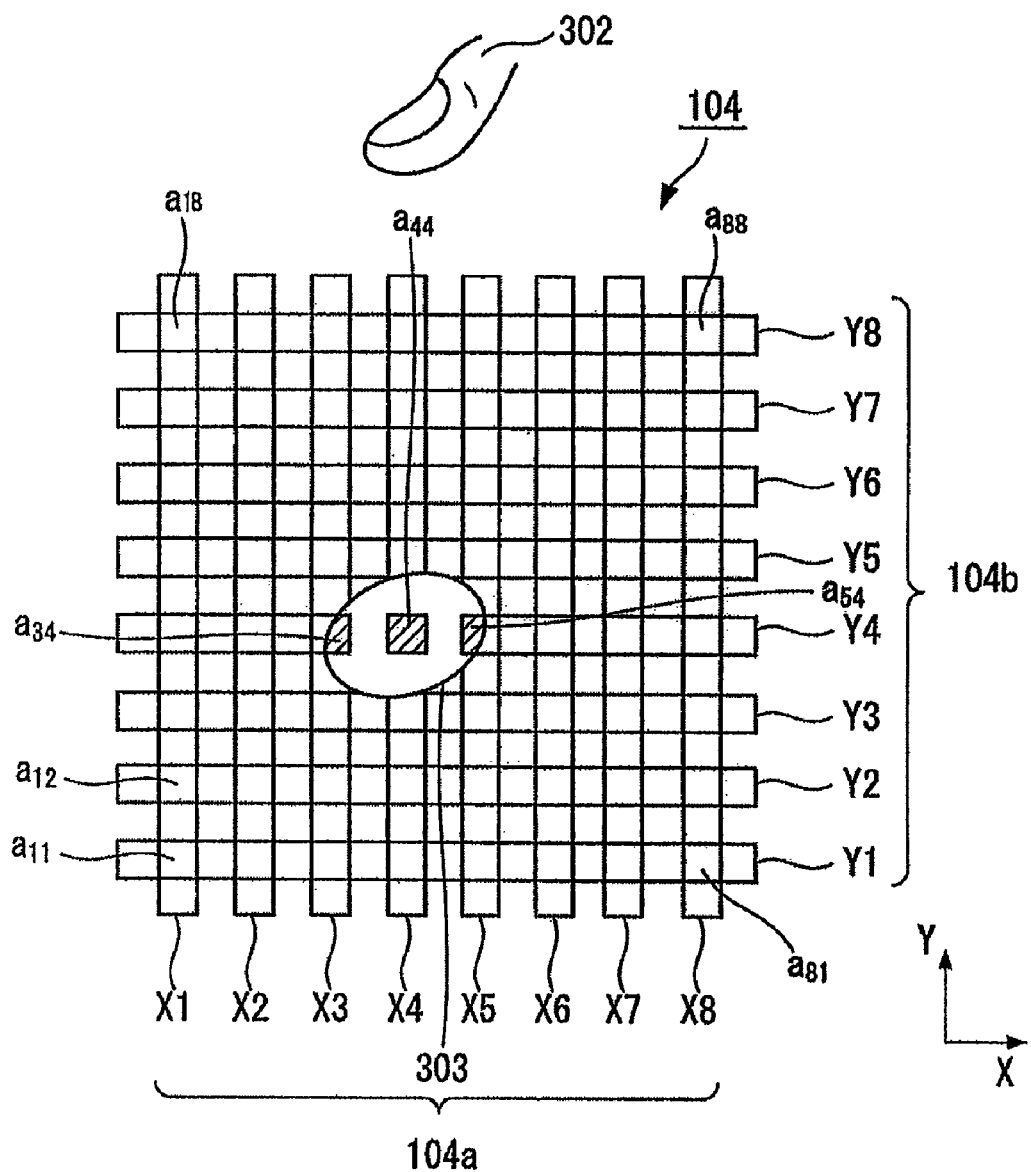
FIG. 3 is a view showing the matrix electrodes according to the previous embodiment.

Next, operation of the position detecting device 101 according to the present embodiment will be described below with reference to FIGS. 1 and 4 to 6. In the following description, the operation of the position detecting device 101 is described using an example in which the matrix electrodes 104 shown in FIG. 3 are formed by eight X-axis electrodes 104a and eight Y-axis electrodes 104b; terminal Xs1 of the X-axis electrode side change-over switch 103, as seen in FIG. 1, is connected to the driving section 102; Y-axis electrode Y4 is selected by the Y-axis electrode side change-over switch 105 at first; and a finger 302 is touching an area 303 that covers electrode intersections $a_{34}$, $a_{44}$, and $a_{54}$.

Further, in the matrix electrodes 104 shown in FIG. 3, the number of the intersections of the X-axis electrodes 104a and Y-axis electrodes 104b is 64. In the following description, the position of each of the electrode intersections is defined by the row and column of the X-axis electrodes 104a and Y-axis electrodes 104b. For example, the electrode intersection of X-axis electrode X1 and Y-axis electrode Y2 is defined as electrode intersection $a_{12}$, and the electrode intersection of X-axis electrode X8 and Y-axis electrode Y8 is defined as electrode intersection $a_{88}$.

Figure 4:
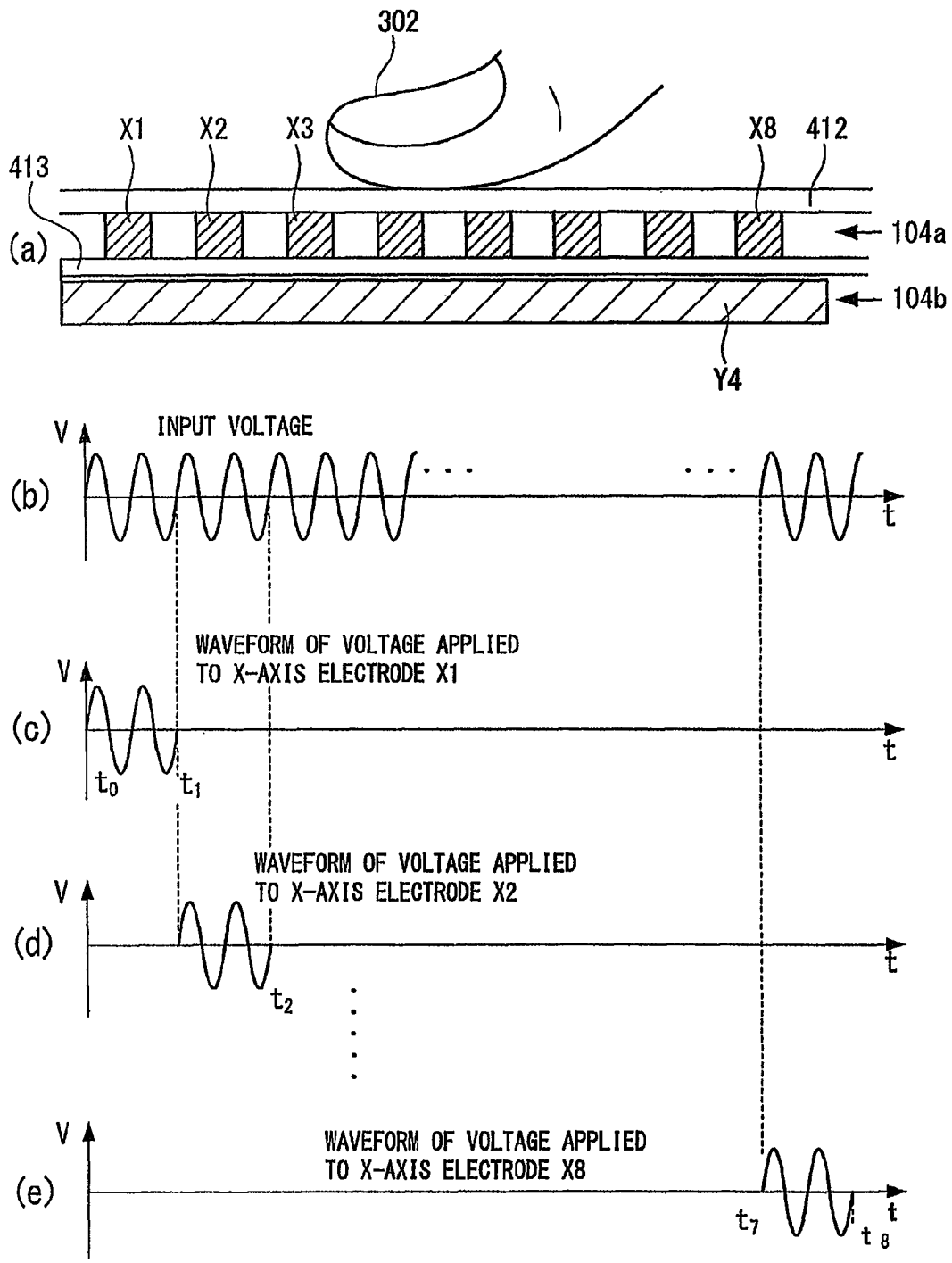
FIG. 4 shows a cross section taken along a Y-axis electrode of the matrix electrodes, waveform diagrams of an AC voltage from a driving section and voltages of each of the electrodes, and timing charts indicating operation timing of predetermined circuit portions.

As shown in (a) of FIG. 4, the surface of the matrix electrodes 104 contacted by the finger 302 is covered by a thin insulating layer 412. Further, a dielectric 413 is interposed between the X-axis electrodes 104a and the Y-axis electrodes 104b. As a result, eight small-capacity capacitors are formed at electrode intersections $a_{14}$, $a_{24}$, $a_{34}$, $a_{44}$, $a_{54}$, $a_{64}$, $a_{74}$, and $a_{84}$ by X-axis electrodes X1 to X8, Y-axis electrode Y4 and the dielectric 413.

Diagram (b) of FIG. 4 is a waveform diagram of the AC voltage of 200 kHz generated by the driving section 102. The waveform shown in diagram (b) of FIG. 4 is detected at point P131 shown in FIG. 1. The AC voltage is applied to any one of X-axis electrodes X1 to X8 through the X-axis electrode side change-over switch 103. In other words, the AC voltage is selectively applied to any one of the eight small-capacity capacitors formed at electrode intersections $a_{14}$, $a_{24}$, $a_{34}$, $a_{44}$, $a_{54}$, $a_{64}$, $a_{74}$, and $a_{84}$.

As described above, since the AC voltage and the rectangular sine wave have a relationship as shown in FIG. 2, if the rectangular sine wave has the same phase as the AC voltage and has a period equal to quadruple the period of the AC voltage, the rise and fall edges of the rectangular sine wave occur once every two periods of the AC voltage and coincide with the timing at which the AC voltage crosses over the zero-cross points. In the present embodiment, by using such a relationship, the change-over operation of the X-axis electrode side change-over switch 103 and Y-axis electrode side change-over switch 105 is performed at the timing when the rectangular wave passes through the zero-cross points (i.e., the change-over operation is performed once every two periods of the AC voltage). In other words, under the control of the synchronous clock generating section 125, the X-axis electrode side change-over switch 103 changes over the terminal connected to the driving section 102 to Xs1, Xs2, Xs3 ... Xs8 sequentially when the AC voltage passes through the rising zero-cross points.

At time t0, the synchronous clock generating section 125 controls the Y-axis electrode side change-over switch 105 to select terminal Ys4, as seen in FIG. 1, to be connected to the receiving section 106, and then controls the X-axis electrode side change-over switch 103 to select terminal Xs1 to be connected to the driving section 102. As a result, the AC voltage (see diagram (b) of FIG. 4) generated by the driving section 102 is applied to the small-capacity capacitor formed at electrode intersection $a_{14}$ (see diagram (c) of FIG. 4 where the diagram represents the voltage over time at the intersection of electrodes $X_1$ and $Y_4$).

Further, after two periods have elapsed from time t0 (i.e., at time t1), the synchronous clock generating section 125 controls the X-axis electrode side change-over switch 103 to change over from terminal Xs1 to terminal Xs2. In other words, the terminal Xs2 is connected to the driving section 102. As a result, the AC voltage is applied to the small-capacity capacitor formed at electrode intersection $a_{24}$ (see diagram (d) of FIG. 4).

In the same manner, the synchronous clock generating section 125 controls the X-axis electrode side change-over switch 103 to perform a change-over operation once every two periods of the AC voltage, so that terminals Xs3, Xs4, ..., Xs8 are sequentially selected. As a result, the AC voltage is applied to the small-capacity capacitors formed at electrode intersections $a_{34}$, $a_{44}$, ..., $a_{84}$ sequentially. At the time when terminal Xs8 of the X-axis electrode side change-over switch 103 is selected, the scanning of the X-axis electrode side change-over switch 103 with respect to Y-axis electrode Y4 is terminated.

Further, after two periods of the AC voltage have elapsed from the time when the synchronous clock generating section 125 controls the X-axis electrode side change-over switch 103 to change over the terminal connected to the driving section 102 to terminal Xs7 (i.e., at time t8), the synchronous clock generating section 125 controls the Y-axis electrode side change-over switch 105 to change over to terminal Ys5, and controls the X-axis electrode side change-over switch 103 to change over to terminal Xs1. As a result, the AC voltage is applied to the small-capacity capacitor formed at electrode intersection $a_{15}$.

In the same manner, the synchronous clock generating section 125 controls the X-axis electrode side change-over switch 103 to perform a change-over operation once every two periods of the AC voltage, so that terminals Xs2, Xs3, . . . , Xs8 are sequentially selected. As a result, the AC voltage is applied to the small-capacity capacitors formed at electrode intersections $a_{15}, a_{25}, \ldots, a_{85}$ sequentially. At the time when terminal Ys5 of the Y-axis electrode side change-over switch 105 and terminal Xs8 of the X-axis electrode side change-over switch 103 are selected, the scanning of the X-axis electrode side change-over switch 103 with respect to Y-axis electrode Y5 is terminated.

The change-over operation for selecting terminals Xs1, Xs2, . . . , Xs8 of the X-axis electrode side change-over switch 103 is sequentially performed once every two periods of the AC voltage for other terminals Ys1, Ys2, Ys3, Ys6, Ys7, and Ys8. As a result, the AC voltage is sequentially applied to the capacitors formed at all electrode intersections of the matrix electrodes 104.

As described above, in the position detecting device 101 according to the present embodiment, the change-over operation of the X-axis electrode side change-over switch 103 and Y-axis electrode side change-over switch 105 is performed when the AC signal generated by the driving section 102 passes through the zero-cross points.

The change-over operation should be performed at such timing so that the level of the signal corresponding to each of the electrode intersections passing through the LPF 115 (which will be described later with reference to diagram (i) of FIG. 6) will be uniform so as to reduce variations in sensitivity for each electrode intersection. By controlling the change-over timing of the change-over switches in the described manner, a user's finger can be detected at the same sensitivity at each of the electrode intersections.

Figure 5:
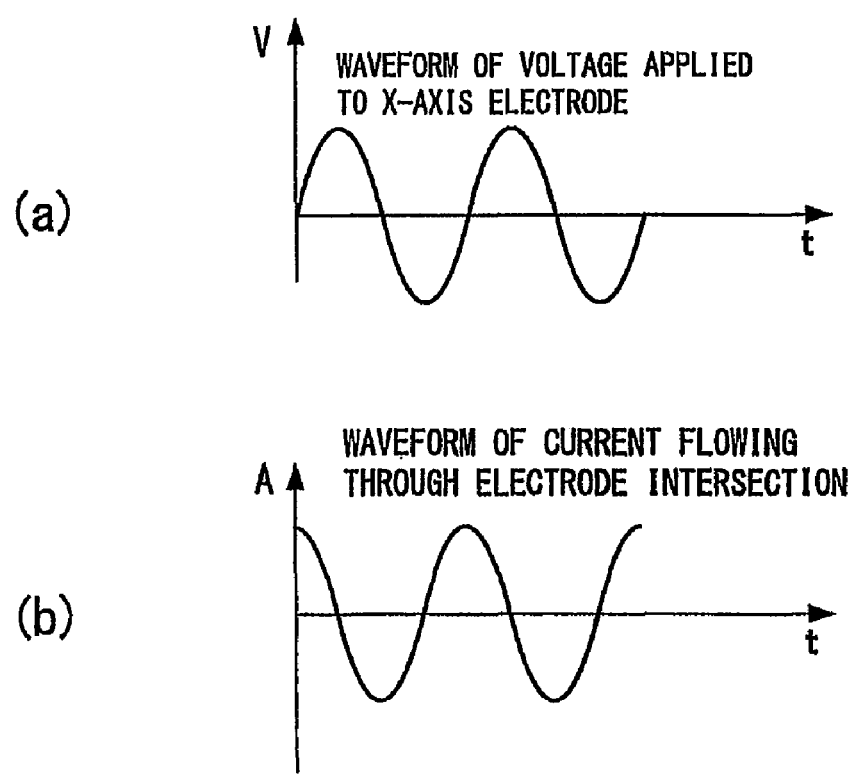
FIG. 5 shows a relationship between voltage and current of a capacitor formed at an electrode intersection of matrix electrodes.

When an AC voltage shown in diagram (a) of FIG. 5 is applied to the small-capacity capacitor, a current shown in diagram (b) of FIG. 5 will flow through the small-capacity capacitor. The phase of the current shown in diagram (b) of FIG. 5 is advanced by 90 degrees compared with the phase of the AC voltage shown in diagram (a) of FIG. 5.

In other words, when the AC voltages shown in diagrams (c) to (e) of FIG. 4 are applied to the small-capacity capacitors formed at the electrode intersections $a_{14}, a_{24}, a_{34}, a_{44}, a_{54}, a_{64}, a_{74}$, and $a_{84}$, the current having a phase advanced by 90 degrees will flow through the small-capacity capacitors for two periods (i.e., for the periods corresponding to periods of the AC voltage applied to the small-capacity capacitors).

Next, the currents flowing through the respective electrode intersections and the signals of predetermined circuit portions at the time when the AC voltage generated by the driving section 102 is applied to the respective electrodes will be described with reference to FIGS. 4 and 6.

Figure 6:
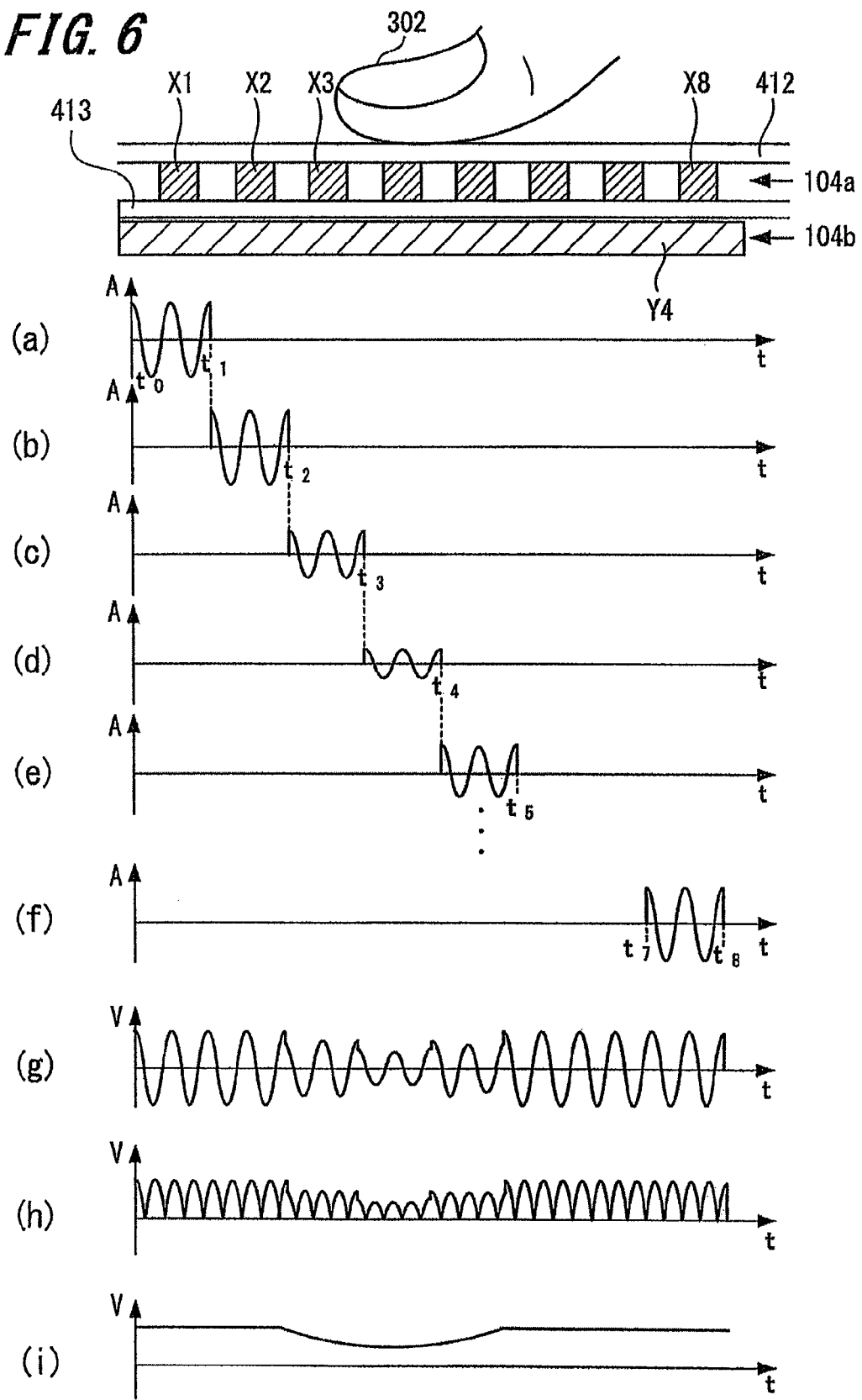
FIG. 6 shows waveform diagrams of currents flowing through capacitors formed at a plurality of electrode intersections of the matrix electrodes when the AC voltage is applied.

When the AC voltage is applied to electrode intersections $a_{14}, a_{24}, a_{34}, a_{44}, a_{54}, a_{64}, a_{74}$, and $a_{84}$, currents shown in diagrams (a) to (f) of FIG. 6 will flow through the respective small-capacity capacitors formed at electrode intersections $a_{14}, a_{24}, a_{34}, a_{44}, a_{54}, a_{64}, a_{74}$, and $a_{84}$. The following description will focus on the currents flowing through the small-capacity capacitors formed at electrode intersections $a_{34}, a_{44}$, and $a_{54}$ as shown in diagrams (c) to (e) of FIG. 6.

The currents flowing through the small-capacity capacitors formed at electrode intersections $a_{34}, a_{44}$, and $a_{54}$ are weaker than the currents flowing through the small-capacity capacitors formed at other electrode intersections (i.e., electrode intersections $a_{14}, a_{24}$, etc.). This is because when the finger 302 approaches electrode intersections $a_{34}, a_{44}$, and $a_{54}$ as shown in diagram (a) of FIG. 4, a part of the electric force field lines generated by the electrodes will be drawn toward the finger side. However, electrode intersection $a_{44}$, which is completely covered by the finger 302, has more field lines of electric force drawn toward the finger side compared with electrode intersections $a_{34}$ and $a_{54}$, which are partially covered by the finger 302. For this reason, the current shown in diagram (d) of FIG. 6 is weaker than the currents shown in diagrams (c) and (e) of FIG. 6.

The currents flowing through the respective small-capacity capacitors formed at electrode intersections $a_{14}, a_{24}, a_{34}, a_{44}, a_{54}, a_{64}, a_{74}$, and $a_{84}$ are caused by applying the AC voltage generated by the driving section 102 to the X-axis electrodes by the scanning of the X-axis electrode side change-over switch 103. Since the change-over operation of the X-axis electrode side change-over switch 103 is sequentially performed once every two periods of the AC voltage, the current inputted from the Y-axis electrode side change-over switch 105 to the receiving section 106 has a waveform obtained by adding the currents flowing through the respective small-capacity capacitors formed at electrode intersections $a_{14}, a_{24}, a_{34}, a_{44}, a_{54}, a_{64}, a_{74}$, and $a_{84}$. Further, such a current is inputted to the current-voltage converter 113 from Y-axis electrodes Y4 through terminal Ys4 of the Y-axis electrode side change-over switch 105.

The current flowing through the respective small-capacity capacitors formed at electrode intersections $a_{14}, a_{24}, a_{34}, a_{44}, a_{54}, a_{64}, a_{74}$, and $a_{84}$ is converted into a voltage by the current-voltage converter 113 and amplified by the preamplifier 117. The waveform of the signal having been amplified by the preamplifier 117 is shown in diagram (g) of FIG. 6 and can be detected at point P132 shown in FIG. 1. The signal shown in diagram (g) of FIG. 6 is inputted to the synchronous detector 114.

The signal shown in diagram (g) of FIG. 6 is synchronously detected by the synchronous detector 114 and the result is outputted. The signal shown in diagram (g) of FIG. 6 is synchronously detected by the synchronous detector 114 where the signal is converted into a pulsating voltage signal. Diagram (h) of FIG. 6 shows the waveform of the pulsating voltage signal which can be detected at point P133 shown in FIG. 1. The signal having been subjected to the synchronous detection by the synchronous detector 114 is inputted to the LPF 115.

In the LPF 115, the frequency components of 50 kHz or higher of the signal shown in diagram (h) of FIG. 6 are removed. The waveform of the voltage signal having been subjected to processing by the LPF 115 is shown in diagram (i) of FIG. 6, and can be detected at point P134 shown in FIG. 1.

The cut-off frequency of the LPF 115 is set to 50 kHz, for example. Since the frequency of the AC voltage applied to each of the small-capacity capacitors of the matrix electrodes 104 is 200 kHz, the main frequency component of the voltage signal shown in diagram (h) of FIG. 6 is 200 kHz. For this reason, the cut-off frequency of the LPF 115 is set to 50 kHz, so that the frequency component 200 kHz is removed from the voltage signal shown in diagram (h) of FIG. 6 while obtaining an ideal envelope for detecting the finger 302.

Further, the signal outputted from the LPF 115 is converted into digital data by the A/D converter 116, and the digital data is inputted to the position calculating section 124. The position calculating section 124 serves a function of a microcomputer. Based on the digital data obtained from the A/D converter 116, the position calculating section 124 calculates the value of the current flowing through the small-capacity capacitor formed at each of the electrode intersections of the matrix electrodes 104. Based on the calculated value of the current, the position calculating section 124 detects the position of the finger and outputs the result as position data.

Figure 7:
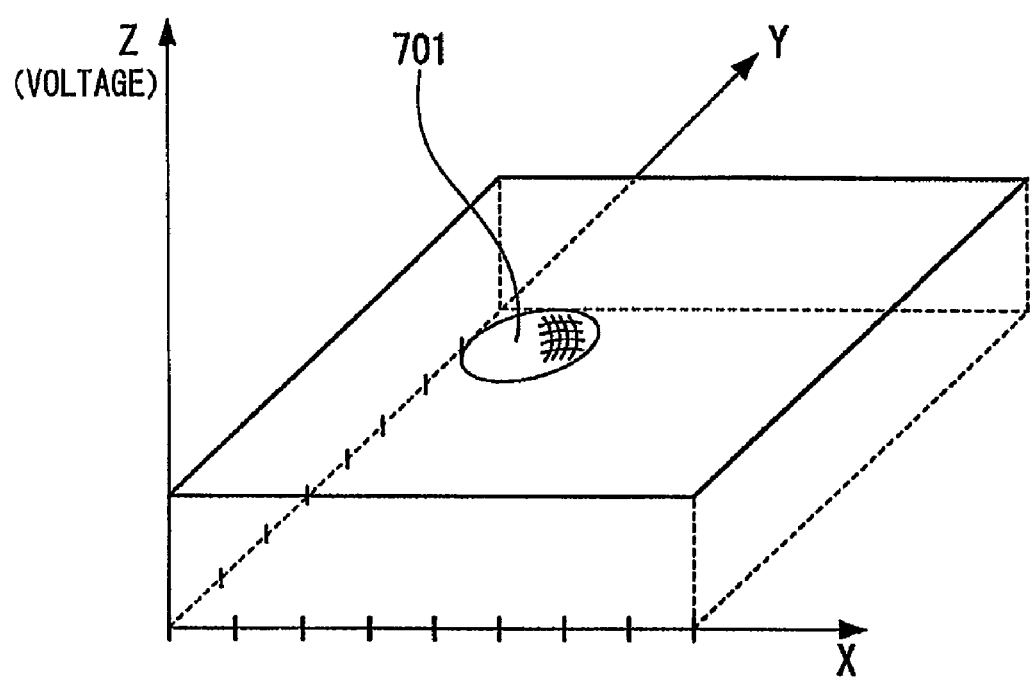
FIG. 7 is a view showing a detected position of a finger on a three-dimensional graph based on the position detecting device.
Figure 8:
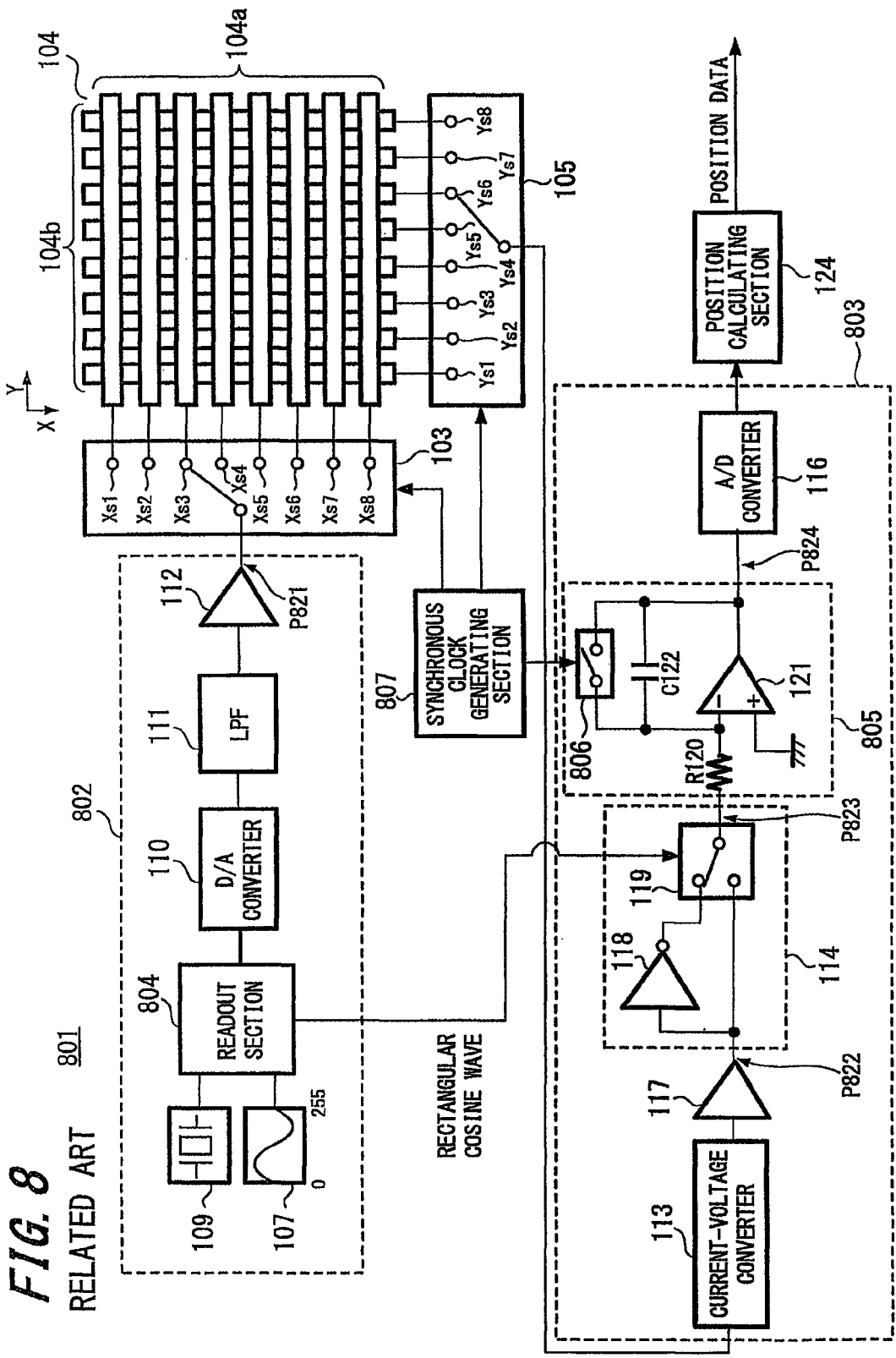
FIG. 8 is a block diagram showing a configuration of a position detecting device according to the related art.
Figure 9:
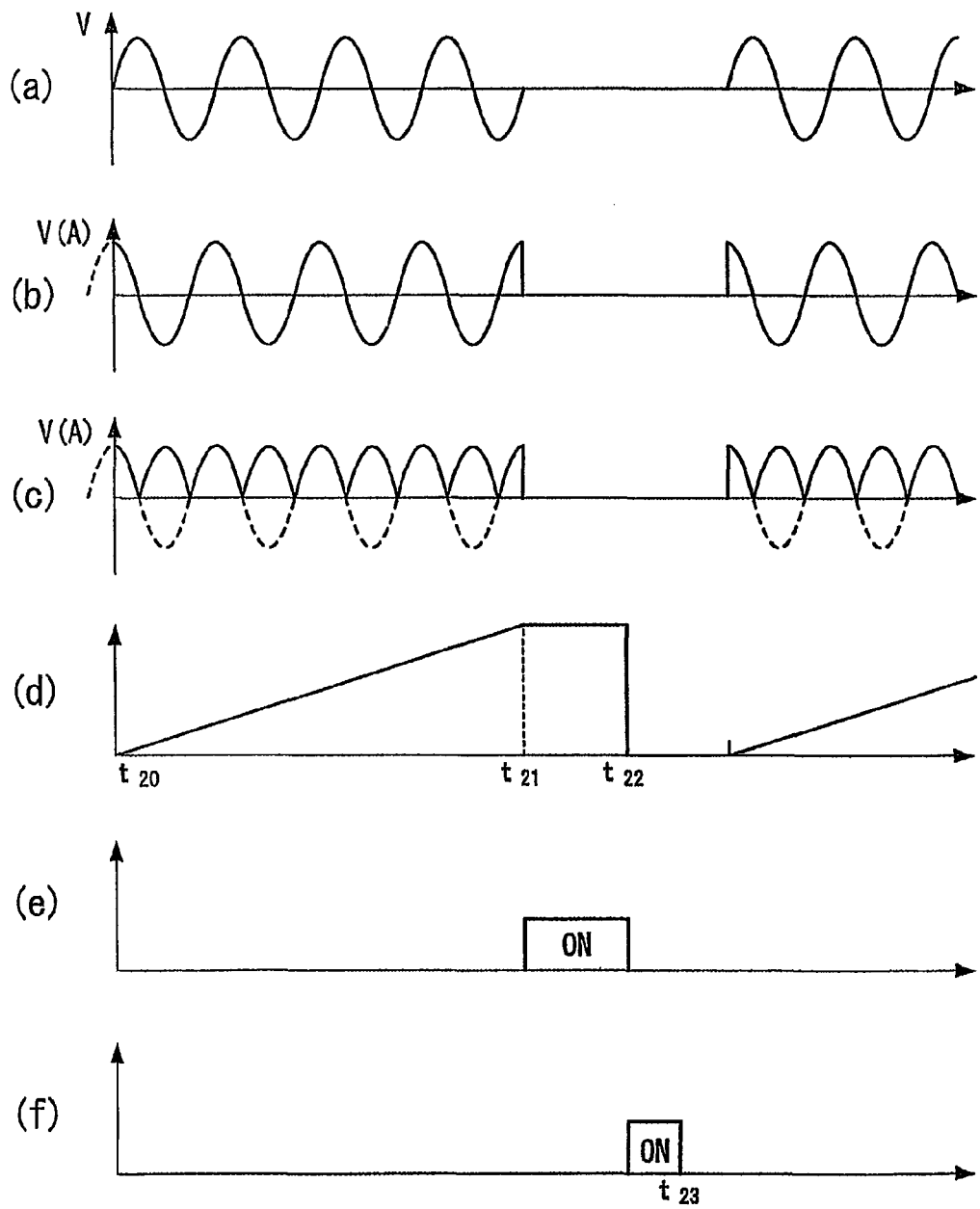
FIG. 9 shows waveform diagrams indicating changes of signals generated by the position detecting device according to the related art and timing charts indicating operation timing of predetermined circuit portions.

The processing result of the position calculating section 124 can be indicated as a three-dimensional graph shown in FIG. 7. The three-dimensional graph is obtained by normalizing the output of the A/D converter 116, which corresponds to all electrode intersections of the matrix electrodes 104, to a predetermined scale. In the three-dimensional graph of FIG. 7, the X-axis represents the number of the X-axis electrodes 104a and the Y-axis represents the number of the Y-axis electrodes 104b. In this example, the number of the X-axis electrodes 104a and the number of the Y-axis electrodes 104b are both eight. Further, the Z-axis of the three-dimensional graph represents the voltage value.

In the three-dimensional graph of FIG. 7, a portion 701, in which the voltage value is lower than that in other portions, corresponds to the position where the current flowing through the small-capacity capacitor formed at each of the electrode intersections of the matrix electrodes 104 is reduced, namely, the portion 701 corresponds to the position contacted by the finger 302.

Thus, by continuously detecting the currents flowing through the small-capacity capacitors formed at all electrode intersections of the matrix electrodes 104 and outputting the results, the position and shape of the finger 302 contacting the matrix electrodes 104 can be detected by an external computer or the like.

Although, in the previous description, the change-over operation of the X-axis electrode side change-over switch 103 and Y-axis electrode side change-over switch 105 is performed once every two periods of the AC voltage applied to the matrix electrodes 104, the change-over timing of the change-over switches 103 and 105 is not limited to every two periods of the AC voltage. For example, in the case where the change-over operation of the change-over switches is sequentially performed once each half period of the AC voltage, a rectangular sine wave having the same period as that of the AC voltage may be supplied from the readout section 108 to the synchronous clock generating section 125.

Next, the time necessary for scanning all electrode intersections of the matrix electrodes 104 of the position detecting device 101 will be described below.

As described above, each of the electrode intersections can be detected with time equal to a half period of the AC voltage, for example. In other words, the time necessary for scanning each of the electrode intersections is: ½ (period)÷200 (kHz)= 2.5 (μsec). Thus, the time necessary for scanning all electrode intersections will be: 2.5 (μsec)×number of the electrode intersections.

If the position detecting device 101 of the present embodiment is applied to a liquid crystal display touch panel of 21 inches, for example, the number of the electrode intersections will be about 15,000. In such a touch panel, the time necessary for scanning all electrode intersections with the position detecting device 101 will be: 15,000×2.5 μsec=0.0375 sec.

In the present embodiment, the change-over switching for applying the AC voltage to each of the electrode intersections of the matrix electrodes 104 is performed when the AC voltage passes through the zero-cross points. This way, the currents flowing through the small-capacity capacitors formed at all electrode intersections can be continuously detected without resetting the integrating circuit every time a current flowing through a small-capacity capacitor formed at an electrode intersection is detected. As a result, the time necessary for detecting the finger contacting the touch panel can be reduced.

Although the present embodiment is described using an example in which a low-pass filter (LPF) having a cut-off frequency of 50 kHz is used to remove the frequency component 200 kHz (which is the main frequency component of the AC voltage), other components can be used instead of the low-pass filter as long as the main frequency component of the AC voltage can be removed by such components. For example, any filter (such as a band elimination filter, a band pass filter, or the like) capable of cutting off the frequency component, 200 kHz, may be used instead of the low-pass filter.

Further, although the present embodiment is described using an example in which the AC voltage applied to the matrix electrodes 104 is a sine wave voltage, the AC voltage is not limited to a sine wave voltage. For example, the advantages of the present embodiment may also be achieved if a rectangular sine wave is applied to the matrix electrodes 104.

Further, although the present embodiment is described using an example in which the position of a finger 302 is detected by the position detecting device 101 when the finger 302 is contacting the matrix electrodes, it is also possible to detect positions of a plurality of fingers if the plurality of fingers are contacting the matrix electrodes.

Further, although the present embodiment is described using an example in which the frequency of the AC voltage applied to matrix electrodes 104 is 200 kHz, the frequency of the AC voltage may be any other frequency than 200 kHz as long as such a frequency can be absorbed by the human body.

It is to be understood that the present invention is not limited to the embodiment described above, but includes various modifications and applications without departing from the spirit and scope of the present invention.

What is claimed is:

1. A position detecting device comprising:
X-axis electrodes formed by a plurality of conductors that are arranged substantially parallel to each other;
Y-axis electrodes formed by a plurality of conductors that are arranged substantially parallel to each other and that extend perpendicularly to the X-axis electrodes;
a driving section configured to supply an AC signal to the X-axis electrodes;
a synchronous clock generating section configured to generate a synchronous clock signal at the timing when the AC signal passes through a zero-cross point;
a first change-over switch configured to selectively supply the AC signal to a determined electrode among the X-axis electrodes at the timing of the synchronous clock signal, which is generated at the timing of the AC signal passing through a zero-cross point;
a second change-over switch configured to select a determined electrode among the Y-axis electrodes at the timing of the synchronous clock signal, which is generated at the timing of the AC signal passing through a zero-cross point;
a synchronous detector configured to detect a signal outputted by the Y-axis electrodes through the second change-over switch, and outputting the detected signal; and
a position calculating section configured to calculate a position indicated by an indicator on the position detecting device, based on the signal outputted from the synchronous detector, the position corresponding to one or more intersections of the X-axis electrodes and Y-axis electrodes.

2. The position detecting device according to claim 1, further comprising a filtering section configured to filter a determined frequency component from the signal outputted from the synchronous detector, and outputting the filtered signal.

3. The position detecting device according to claim 2, wherein the filtering section is selected from a group consisting of a low pass filter, a band elimination filter, and a band pass filter.

4. The position detecting device according to claim 2, wherein the filtering section is configured to remove the main frequency component of the AC signal.

5. The position detecting device according to claim 1, wherein the AC signal is a sine wave.

6. The position detecting device according to claim 1, wherein the AC signal supplied by the driving section is a rectangular wave.

7. A position detecting method for calculating a position indicated by an indicator, the position corresponding to one or more intersections of X-axis electrodes formed by a plurality of conductors that are arranged substantially parallel to each other and Y-axis electrodes formed by a plurality of conductors that are arranged substantially parallel to each other and that extend perpendicularly to the X-axis electrodes, the method comprising:
generating a synchronous clock signal at the timing when an AC signal to be supplied to the X-axis electrodes passes through a zero-cross point;
selectively supplying the AC signal to the X-axis electrodes at the timing of the synchronous clock signal, which is generated at the timing of the AC signal passing through a zero-cross point;
selecting one of the Y-axis electrodes at the timing of the synchronous clock signal, which is generated at the timing of the AC signal passing through a zero-cross point;
detecting a signal outputted by the selected one of the Y-axis electrodes; and
calculating the position indicated by the indicator based on the detected signal.

8. The method according to claim 7, further comprising filtering out a determined frequency component from the detected signal, prior to calculating the position indicated by the indicator.

9. A position detecting device comprising:
X-axis electrodes formed by a plurality of conductors that are arranged substantially parallel to each other;
Y-axis electrodes formed by a plurality of conductors that are arranged substantially parallel to each other and that extend perpendicularly to the X-axis electrodes;
a driving section configured to supply an AC signal to the X-axis electrodes;
a synchronous clock generating section configured to generate a synchronous clock signal at the timing when the AC signal is zero:
a first change-over switch configured to selectively supply the AC signal to a determined electrode among the X-axis electrodes at the timing of the synchronous clock signal, which is generated at the timing of the AC signal being zero;
a second change-over switch configured to select a determined electrode among the Y-axis electrodes at the timing of the synchronous clock signal, which is generated at the timing of the AC signal being zero;
a synchronous detector configured to detect a signal outputted by the Y-axis electrodes through the second change-over switch, and outputting the detected signal; and
a position calculating section configured to calculate a position indicated by an indicator on the position detecting device, based on the signal outputted from the synchronous detector, the position corresponding to one or more intersections of the X-axis electrodes and Y-axis electrodes.

10. The position detecting device according to claim 9, further comprising a filtering section configured to filter a determined frequency component from the signal outputted from the synchronous detector, and outputting the filtered signal.

* * * * *